(12) United States Patent
Line et al.

(10) Patent No.: US 9,796,310 B1
(45) Date of Patent: Oct. 24, 2017

(54) COMPOSITE ONE-PIECE CUSHION NOSE

(71) Applicant: FORD GLOBAL TECHNOLOGIES, LLC, Dearborn, MI (US)

(72) Inventors: Johnathan Andrew Line, Northville, MI (US); Christian J. Hosbach, Taylor, MI (US); Marcos Silva Kondrad, Macomb Township, MI (US); Andrew Matusko, Dexter, MI (US); Rodney Charles Brinker, Easpointe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/221,696

(22) Filed: Jul. 28, 2016

(51) Int. Cl.
*B60N 2/12* (2006.01)
*B60N 2/16* (2006.01)
*B60N 2/18* (2006.01)
*B60N 2/70* (2006.01)
*B60N 2/42* (2006.01)
*B60N 2/48* (2006.01)
*B60N 2/50* (2006.01)

(52) U.S. Cl.
CPC ......... *B60N 2/7094* (2013.01); *B60N 2/4221* (2013.01); *B60N 2/4808* (2013.01); *B60N 2/503* (2013.01)

(58) Field of Classification Search
CPC .. B60N 2/4221; B60N 2/4808; B60N 2/7094; B60N 2/503
USPC ............ 297/284.11, 344.15, 344.16, 344.17, 297/452.18, 452.52, 452.55
See application file for complete search history.

(56) References Cited

U.S. PATENT DOCUMENTS

| | | | | |
|---|---|---|---|---|
| 4,726,623 A | * | 2/1988 | Kazaoka | B60N 2/70 297/452.55 X |
| 4,781,417 A | * | 11/1988 | Shipman | B60N 2/686 297/452.55 X |
| 5,284,381 A | | 2/1994 | Aoki et al. | |
| 5,713,632 A | | 2/1998 | Su | |
| 5,839,782 A | * | 11/1998 | Kashiwamura | B60N 2/548 297/452.55 X |
| 5,857,750 A | * | 1/1999 | Kashiwamura | A47C 7/14 297/452.52 X |
| 6,010,195 A | | 1/2000 | Masters et al. | |

(Continued)

*Primary Examiner* — Rodney B White
(74) *Attorney, Agent, or Firm* — Vichit Chea; Price Heneveld LLP (57) ABSTRACT

A motor vehicle seating assembly for a motor vehicle has a lower seat assembly and an upwardly extending seat back assembly is disclosed, where the lower seat assembly comprises a lower seat frame base having a pair of longitudinally extending mounting rails, a pair of side frame members operably connected with the mounting rails, and a transverse cross tube operatively connected with and extending between a forward portion of the pair of side frame members. A lower seat cushion and suspension module is attached to the lower seat frame base. The lower seat cushion and suspension module further comprises a one-piece composite pan having a forward edge, a suspension system mounted to and supported by the one-piece composite pan, and a one-piece composite nose having a rearward edge pivotally attached proximate the forward edge of the composite pan and a forward facing engagement member pivotally and operably connected with the transverse cross tube.

20 Claims, 9 Drawing Sheets

(56) References Cited

U.S. PATENT DOCUMENTS

| | | | |
|---|---|---|---|
| 6,027,171 A | 2/2000 | Partington et al. | |
| 6,231,125 B1* | 5/2001 | Maeda | A47C 7/282 |
| | | | 297/452.55 |
| 6,361,115 B1* | 3/2002 | Aufrere | B60N 2/2821 |
| | | | 297/452.18 X |
| 6,663,178 B2* | 12/2003 | Fourrey | A47C 7/14 |
| | | | 297/452.52 X |
| 6,773,069 B1* | 8/2004 | Kaneko | B60N 2/1615 |
| | | | 297/344.15 |
| 8,408,654 B2* | 4/2013 | Jones | B60N 2/1803 |
| | | | 297/452.18 X |
| 8,540,318 B2* | 9/2013 | Folkert | B60N 2/686 |
| | | | 297/452.55 X |
| 8,662,483 B2* | 3/2014 | Yamaguchi | B60N 2/002 |
| | | | 297/452.55 X |
| 8,978,236 B2* | 3/2015 | Ferenc | B23K 26/26 |
| | | | 297/452.18 X |
| 9,039,081 B2* | 5/2015 | Arefi | B60N 2/68 |
| | | | 297/188.08 |
| 9,376,043 B2* | 6/2016 | Medoro | B60N 2/686 |
| 9,399,418 B2 | 7/2016 | Line | |
| 9,630,527 B2* | 4/2017 | Matsui | B60N 2/1615 |
| 2007/0040440 A1* | 2/2007 | Kircher | B60N 2/449 |
| | | | 297/452.55 |
| 2009/0152928 A1* | 6/2009 | Choi | B60N 2/68 |
| | | | 297/452.18 |
| 2009/0152929 A1* | 6/2009 | Sung | B60N 2/68 |
| | | | 297/452.18 |
| 2009/0309397 A1* | 12/2009 | Gross | B60N 2/4221 |
| | | | 297/216.1 |
| 2010/0060045 A1* | 3/2010 | Gross | B60N 2/4221 |
| | | | 297/216.1 |
| 2011/0133538 A1* | 6/2011 | Adragna | B60N 2/1615 |
| | | | 297/452.18 |
| 2011/0148173 A1* | 6/2011 | Westerink | B60N 2/24 |
| | | | 297/452.18 |
| 2011/0169317 A1* | 7/2011 | Fujita | A47C 7/02 |
| | | | 297/452.18 X |
| 2011/0278892 A1* | 11/2011 | Kroener | B23K 20/122 |
| | | | 297/452.18 X |
| 2012/0133193 A1* | 5/2012 | Abe | B60N 2/5825 |
| | | | 297/452.55 |
| 2012/0169107 A1* | 7/2012 | Sakkinen | B23K 26/32 |
| | | | 297/452.18 |
| 2012/0193965 A1* | 8/2012 | Saveski | B60N 2/7058 |
| | | | 297/452.18 |
| 2012/0217775 A1* | 8/2012 | Fujita | B60N 2/4221 |
| | | | 297/452.18 X |
| 2013/0119742 A1* | 5/2013 | Wiegelmann | B60N 2/54 |
| | | | 297/452.18 |
| 2013/0193737 A1* | 8/2013 | Morimoto | B60N 2/68 |
| | | | 297/452.18 |
| 2015/0076880 A1 | 3/2015 | Kuhley et al. | |
| 2015/0165950 A1 | 6/2015 | Sachs et al. | |
| 2015/0245716 A1 | 9/2015 | Hwang | |
| 2015/0251579 A1* | 9/2015 | Line | B60N 2/64 |
| | | | 297/452.18 |
| 2015/0258914 A1 | 9/2015 | Lee | |
| 2015/0283931 A1 | 10/2015 | Line | |
| 2016/0135602 A1 | 5/2016 | Smith | |
| 2016/0185265 A1* | 6/2016 | Romer | B60N 2/68 |
| | | | 297/452.55 X |
| 2016/0207433 A1 | 7/2016 | Kondrad | |
| 2016/0302577 A1 | 10/2016 | Mullen | |

* cited by examiner

COMPOSITE ONE-PIECE CUSHION NOSE

FIELD OF THE INVENTION

The present disclosure generally relates to a lower seat cushion and suspension module for a seating assembly for a motion vehicle having a one-piece cushion nose and, more particularly, a lower seat cushion and suspension module provided with integrated modular assembly features and frontal dynamic hip support.

BACKGROUND OF THE INVENTION

Modern motor vehicle seating assemblies are becoming more and more comfortable as designers improve their understanding of human ergonomics, posture, and comfortability. Vehicle seating assemblies that include comfort components in the motor vehicle seating assembly that can provide the driver and passengers with improved comfort and increased endurance for extensive vehicle rides. Additionally, various sizes and shapes of drivers and passengers can prove challenging when providing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important. At the same time, such motor vehicle seating assemblies must also assist in restraining a motor vehicle occupant in the event of an impact event, particularly a frontal impact event.

As a consequence, contemporary motor vehicle seating assemblies now incorporate hundreds of discrete parts. The assembly of such contemporary motor vehicle seating assemblies requires bringing together these hundreds of parts to be assembled into a final motor vehicle seating assembly, typically employing so-called "Kanban" or "Just-In-Time" ("JIT") assembly processes to achieve the completed motor vehicle seat assembly. Using such assembly processes, it has been found to be advantageous to modularize the motor vehicle seating assembly into discrete subassemblies in order to reduce the costs of final assembly. This allows the subassemblies to be sourced from a location independent of the final JIT assembly plant. An improved motor vehicle seating assembly module design to achieve all of the needs of the motor vehicle seating assembly, particularly a lower seat cushion and suspension module to provide these assembly advantages, as well as achieving a new look for styling, was desired.

SUMMARY OF THE INVENTION

According to one aspect of the present disclosure, a motor vehicle seating assembly for a motor vehicle having a lower seat assembly and an upwardly extending seat back assembly is disclosed, the lower seat assembly comprising a lower seat frame base having a pair of longitudinally extending mounting rails, a pair of side frame members operably connected with the mounting rails, and a transverse cross tube operatively connected with and extending between a forward portion of the pair of side frame members. A lower seat cushion and suspension module is attached to the lower seat frame base, the lower seat cushion and suspension module further comprising a one-piece composite pan having a forward edge, a suspension system mounted to and supported by the one-piece composite pan, and a one-piece composite nose having a rearward edge pivotally attached proximate the forward edge of the composite pan and a forward facing engagement member pivotally and operably connected with the transverse cross tube.

According to another aspect of the present disclosure, a lower seat assembly comprises a lower seat frame base having a transverse cross tube extending between a forward portion of a pair of side frame members, and a module attached to the lower seat frame base comprising a one-piece composite pan having a forward edge and a one-piece composite nose having a rearward edge pivotally attached proximate the forward edge of the composite pan and an engagement member pivotally connected with the transverse cross tube.

According to yet another aspect of the present disclosure, a motor vehicle seating assembly comprises a lower seat assembly and an upwardly extending seat back assembly. The lower seat assembly comprises a lower seat frame base having a pair of longitudinally extending mounting rails, a pair of side frame members operably connected with the mounting rails, and a transverse cross tube operatively connected with and extending between a forward portion of the pair of side frame members. A lower seat cushion and suspension module is attached to the lower seat frame base, the lower seat cushion and suspension module further comprising a one-piece composite pan having a forward edge, a suspension system mounted to and supported by the one-piece composite pan, and a one-piece composite nose having a rearward edge pivotally attached proximate the forward edge of the composite pan via a pair of pivots disposed on outer edges of each of the one-piece composite pan an one-piece composite nose, wherein the one-piece composite nose further includes a lower surface and a plurality of integral molded-in forward facing modular assembly hooks disposed on the lower surface wherein each of the integral molded-in modular assembly hooks pivotally and resiliently engages the transverse cross tube for modular attachment of the lower seat cushion and suspension module to the lower seat frame base, wherein the forward edge of the one-piece composite pan further comprises an inclined bearing surface against which the weight of an occupant in the motor vehicle seating assembly is urged in the event of a frontal impact event, such that the one-piece composite nose rotates forwardly and upwardly about the integral molded-in modular assembly hooks, and the rearward edge of the one-piece composite nose rotates upwardly around the pivot to raise the forward edge of the one-piece composite pan.

These and other aspects, objects, and features of the present disclosure will be understood and appreciated by those skilled in the art upon studying the following specification, claims, and appended drawings.

DETAILED DESCRIPTION OF THE EMBODIMENTS

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
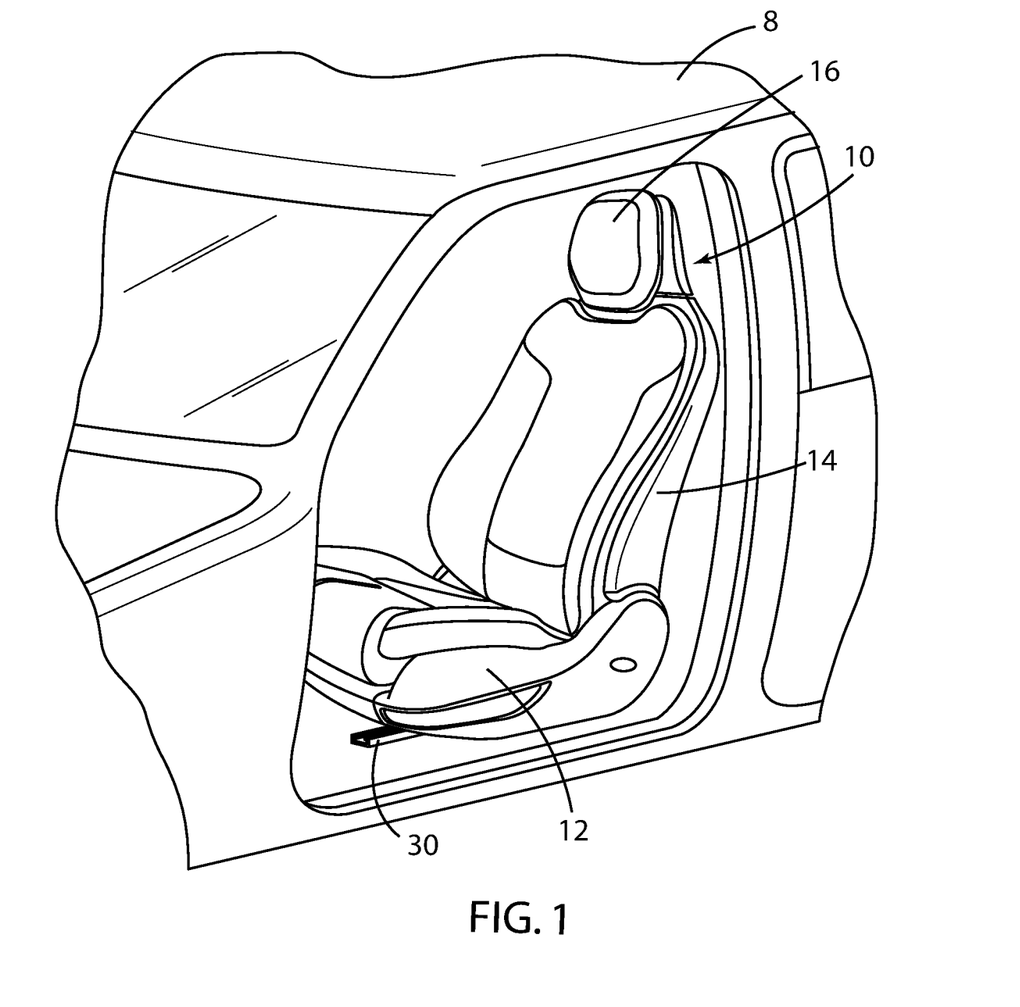
FIG. 1 is a front side perspective view of motor vehicle provided with the motor vehicle seating assembly of the present disclosure.
Figure 2:
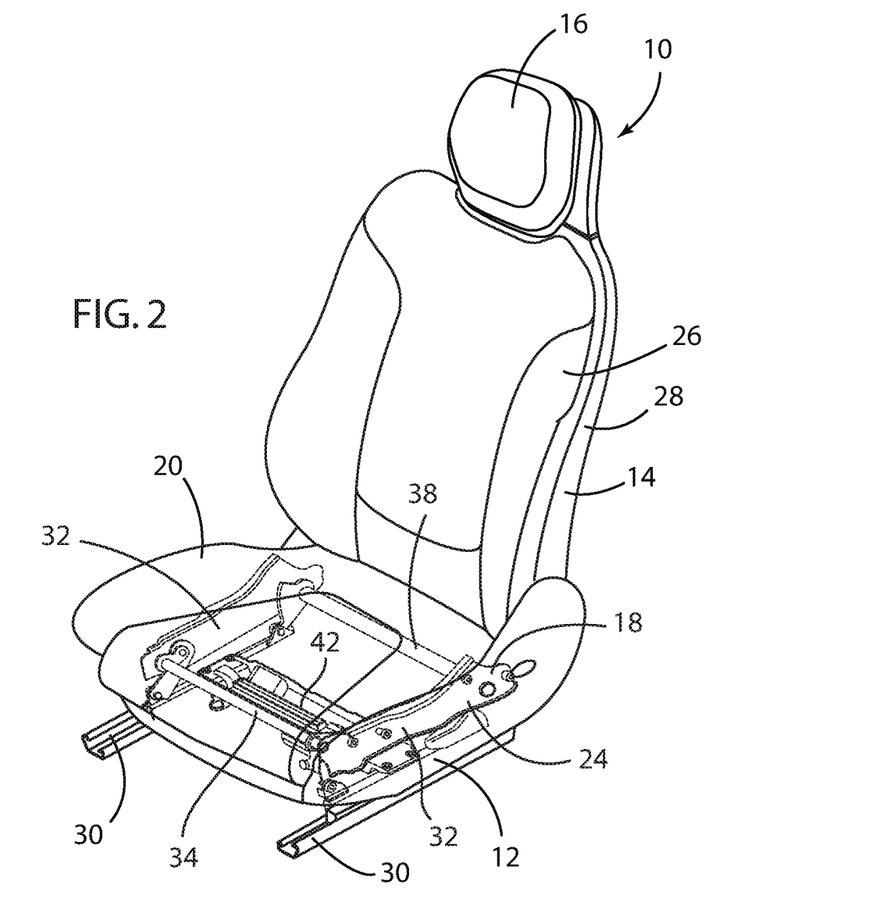
FIG. 2 is a front side perspective view of the motor vehicle seating assembly of FIG. 1 according to the present disclosure.

Referring to FIGS. 1 and 2, reference numeral 10 generally designates a motor vehicle seating assembly for a motor vehicle 8 having a lower seat assembly 12 and an upwardly extending seat back assembly 14. The seat back assembly 14 preferably supports a headrest 16 thereon. The seat back assembly 14 is pivotally coupled with the lower seat assembly 12, such that the seat back assembly 14 can be moved between upright and inclined positions relative to the lower seat assembly 12. The headrest 16 is operably and, preferably, slidably connected with the seat back assembly 14 and also positioned in a variety of positions and heights relative to the seat back assembly 14 to support the head and neck of a driver or a passenger.

Figure 3:
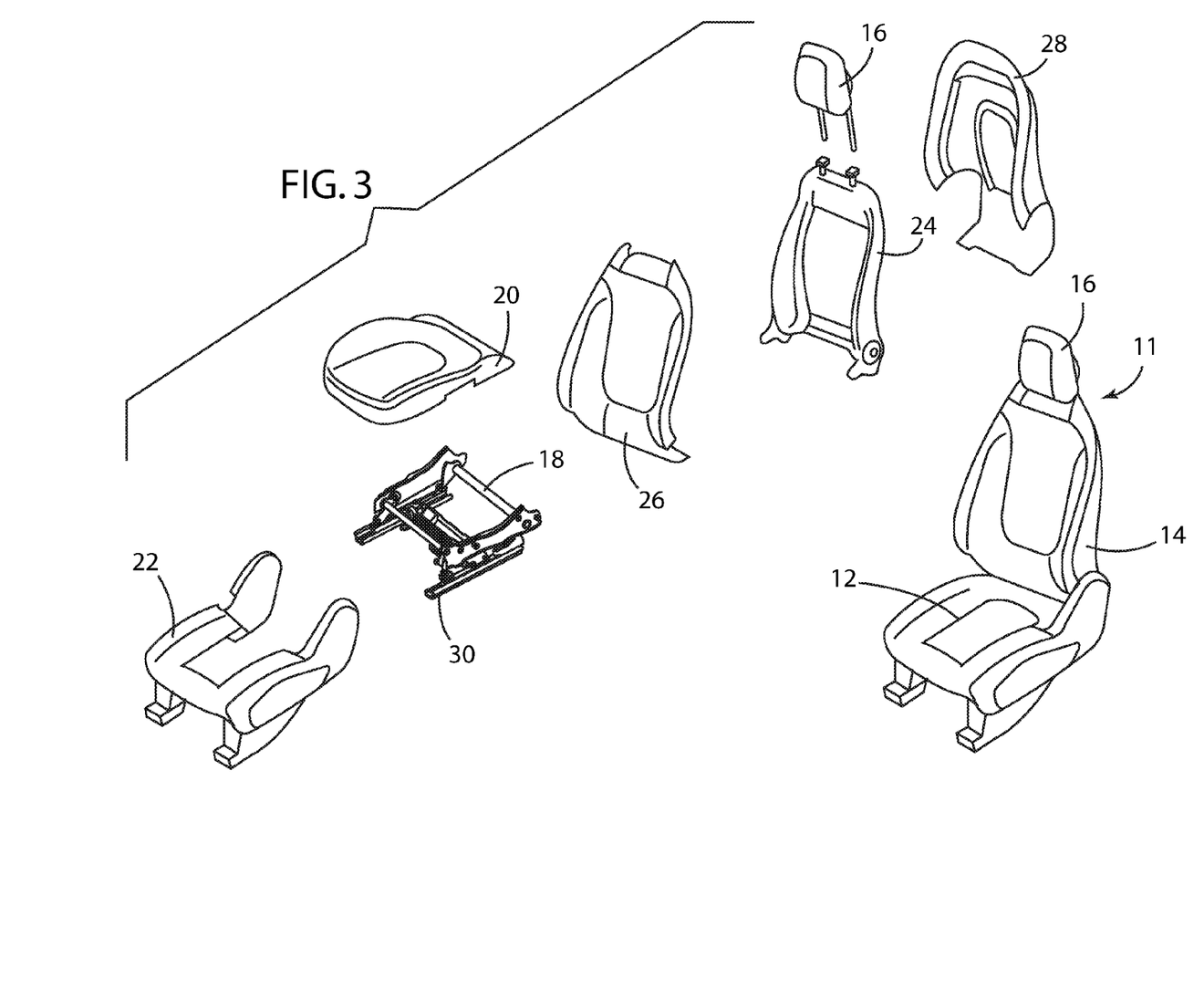
FIG. 3 is an exploded front side perspective view of the motor vehicle seating assembly of FIG. 1 according to the present disclosure.

Referring to FIG. 3, the lower seat assembly 12 includes a lower seat frame base 18 to which a lower seat cushion and suspension module 20 is attached, as further discussed herein. A decorative plastic fascia 22 is mounted to the lower seat assembly 12 and about the seat cushion and suspension module 20. The seat back assembly 14 includes a seat back frame 24, an upper seat back cushion and suspension module 26, a seat back panel module 28, and the headrest 16.

Figure 4:
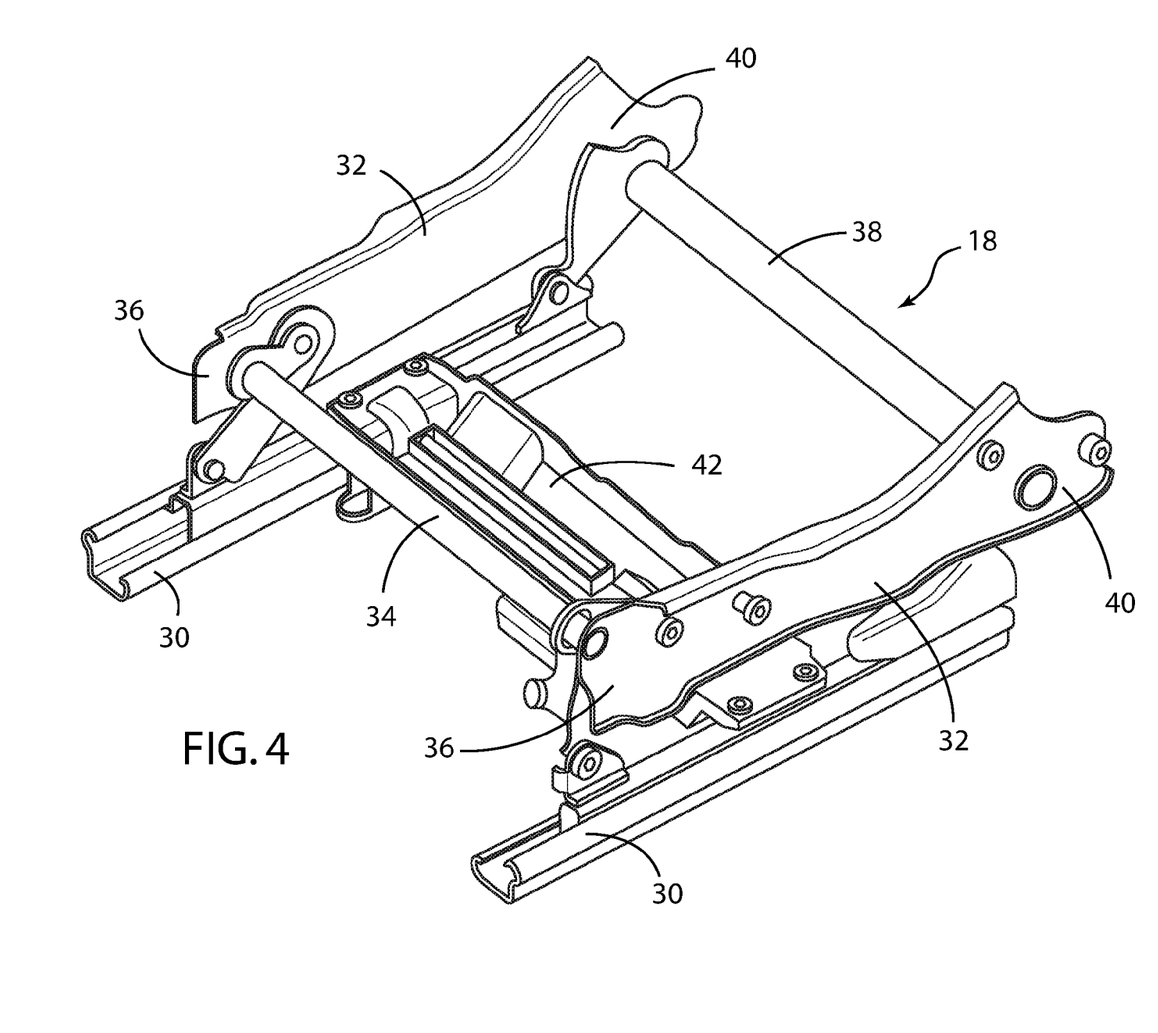
FIG. 4 is a perspective front side view of the lower seat frame base of the motor vehicle seating assembly of FIG. 1 according to the present disclosure.
Figure 5:
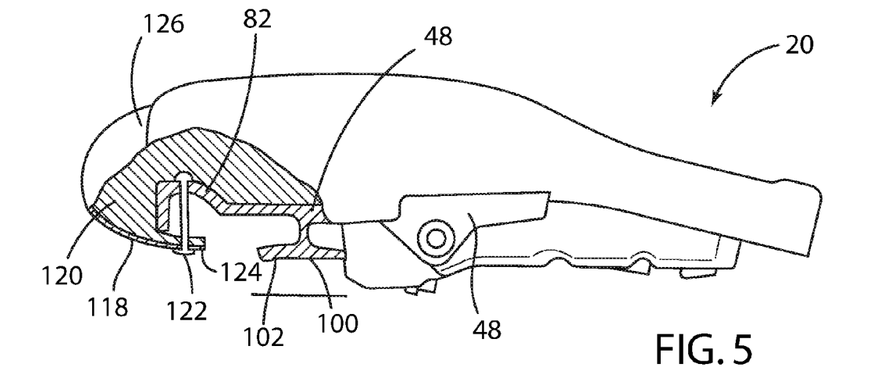
FIG. 5 is a side view of the lower seat cushion and suspension module of the motor vehicle seating assembly of FIG. 1 according to the present disclosure.
Figure 6:
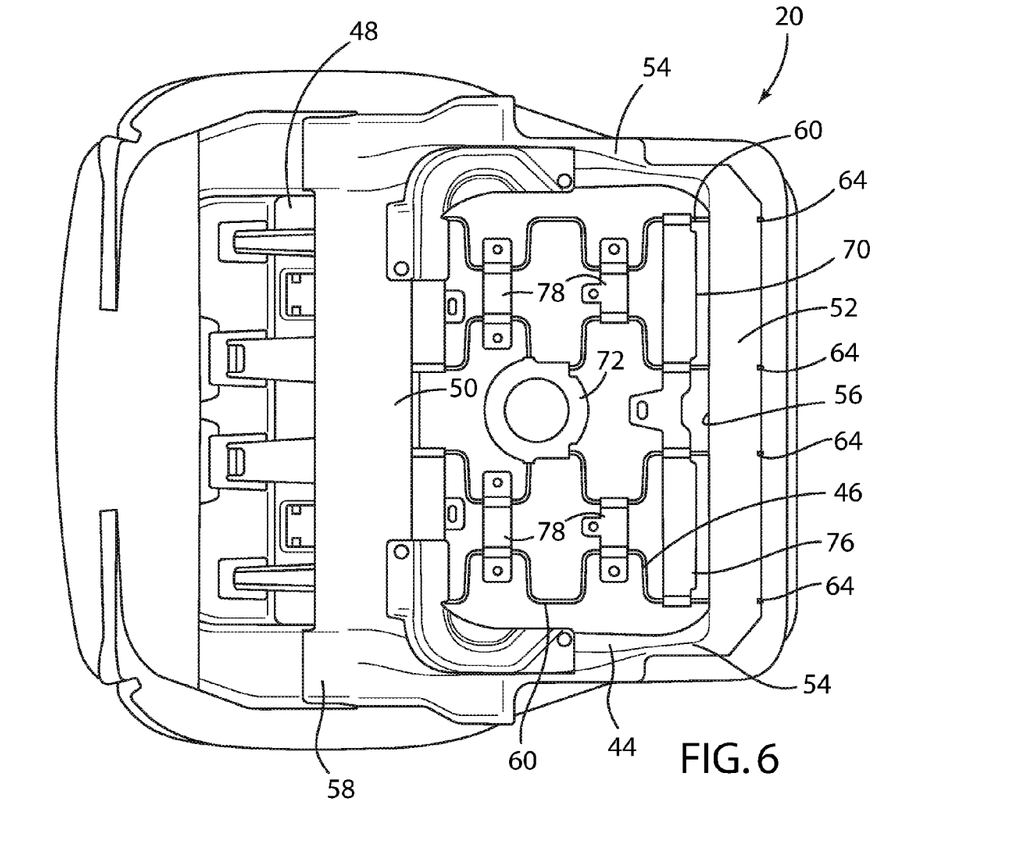
FIG. 6 is a bottom view of the lower seat cushion and suspension module of the motor vehicle seating assembly of FIG. 1 according to the present disclosure.

As best shown in FIG. 4, the lower seat frame base 18 of the lower seat assembly 12 includes a pair of longitudinally extending mounting rails 30, a pair of side frame members 32 operably connected with the mounting rails 30, and a front transverse cross tube 34 operatively connected with and extending between a forward portion 36 of the pair of side frame members 32. A rear transverse cross tube 38 is preferably operably connected with and extends between a rear portion 40 of the pair of side frame members 32. One or more additional transverse members 42 can be provided to which can be mounted the various features and accessories for the motor vehicle seating assembly 10, such as solenoids and motors (not shown) for operation of the various seating adjustment mechanisms.

A particularly advantageous feature of the present disclosure is the lower seat cushion and suspension module 20, which may be assembled at a different location and shipped to the final assembly location for attachment to the lower seat frame base 18. By virtue of the features incorporated into the lower seat cushion and suspension module 20 in accordance with the present disclosure, the lower seat cushion and suspension module 20 can be readily assembled to the lower seat frame base 18 and consequently the motor vehicle seating assembly 10.

In particular, the lower seat cushion and suspension module 20 includes a one-piece composite pan 44, a suspension system 46 mounted to and supported by the one-piece composite pan 44, and a one-piece composite nose 48. As shown in FIGS. 6, 7, 8, 9, and 12, the one-piece composite pan 44 is preferably formed as an integrated and unitary structure via an injection molding process from a rigid plastic material containing reinforcing fibers, such as fiberglass fibers. The one-piece composite pan 44 is generally comprised of a front transverse member 50, a rear transverse member 52, and a pair of opposed longitudinal side members 54 joining the front transverse member 50 and the rear transverse member 52. A generally rectangular opening 56 is defined by the front and rear transverse members 50, 52 and the opposed longitudinal side members 54. A forward edge 58 is provided on the front transverse member 50 of the one-piece composite pan 44, which interacts with the one-piece composite nose 48, as further discussed below.

Figure 7:
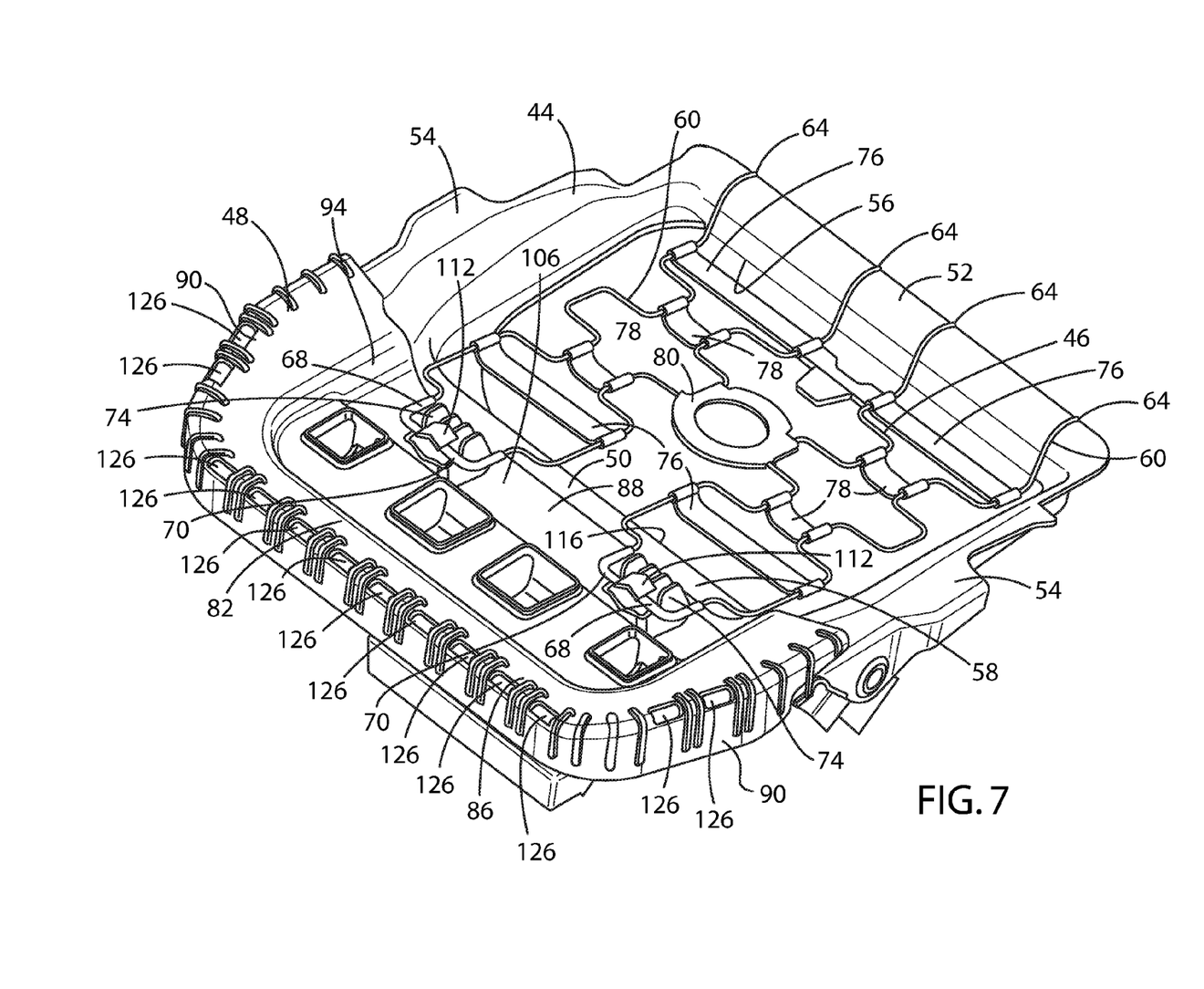
FIG. 7 is a perspective front side view of the one-piece composite pan, one-piece composite nose, and suspension system of the lower seat cushion and suspension module of the motor vehicle seating assembly of FIG. 1 according to the present disclosure.
Figure 8:
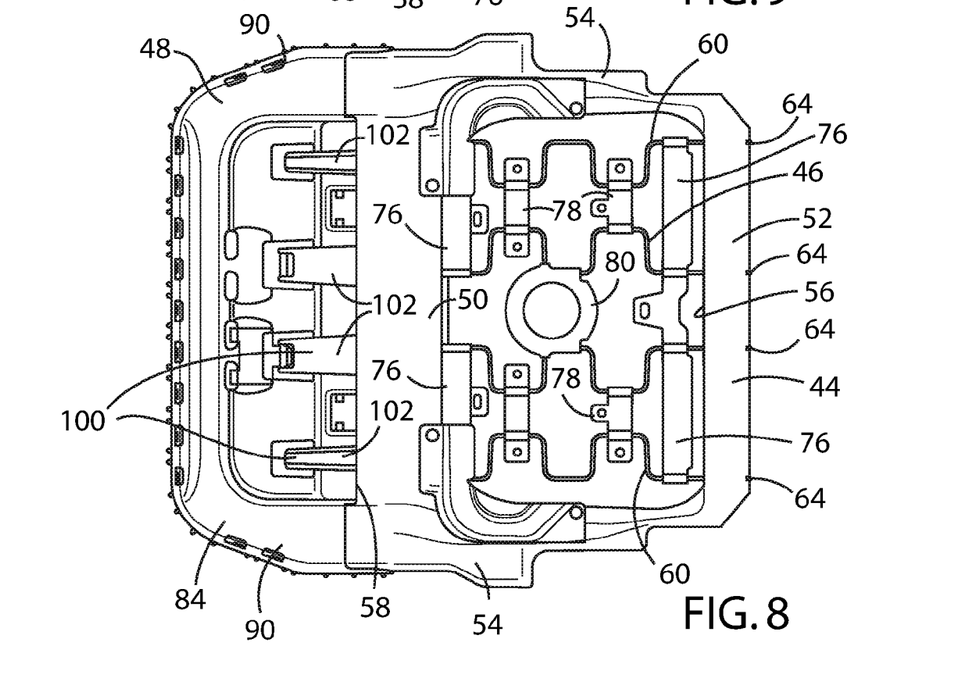
FIG. 8 is a bottom view of the one-piece composite pan, one-piece composite nose, and suspension system of the lower seat cushion and suspension module of the motor vehicle seating assembly of FIG. 1 according to the present disclosure.

Preferably, the one-piece composite pan 44 supports the suspension system 46 within the generally rectangular opening 56 to resiliently support the weight of an occupant sitting in the motor vehicle seating assembly 10. The suspension system 46 generally comprises a pair of metal, preferably spring steel, wires 60 having a nominal thickness that are bent in a regular and alternating manner and extending between the front transverse member 50 and the rear transverse member 52, as best shown in FIG. 7. The ends 64 of each of the pair of metal wires 60 are bent over and thereby mounted to the rear transverse member 52. A forward portion 68 of the suspension system 46 includes a pair of forward extending buckles 70 of each of the wires 60 that is received within an integrated cushion suspension modular attachment engagement member 74, as described further below. At regular intervals between the metal wires 60, transverse opposed connectors 76 and transverse adjacent connectors 78 operably connect the metal wires 60. A central connector 80 is disposed substantially in the middle of the generally rectangular opening 56 and operably connects each of the pair of wires 60 one to the other. The result is a suspension system 46 that has a spring web situated within the generally rectangular opening 56 and which provides resilient support against the weight of the occupant in a motor vehicle seating assembly 10.

Figure 12:
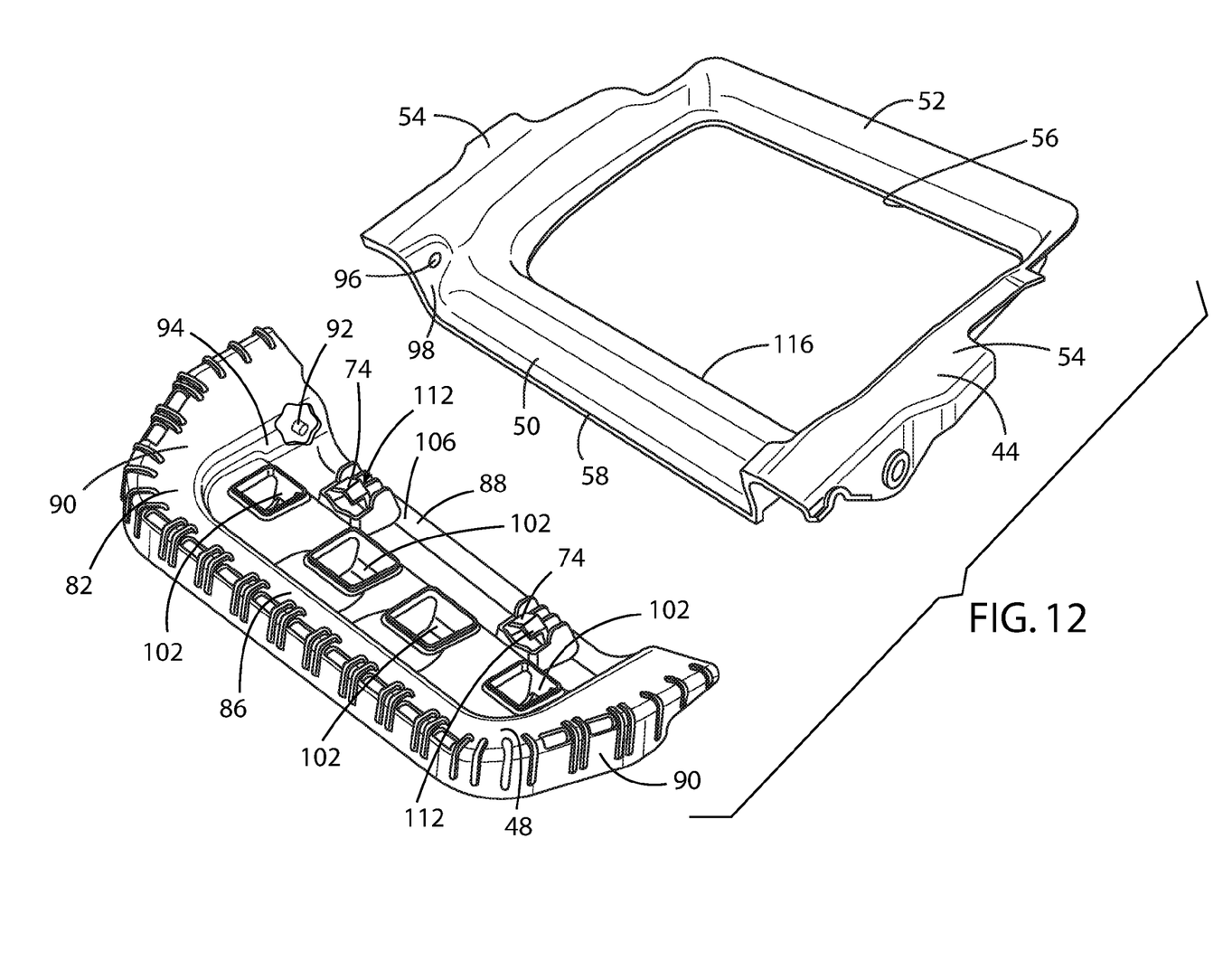
FIG. 12 is a perspective front top view of the one-piece composite pan and one-piece composite nose of the lower seat cushion and suspension module of the motor vehicle seating assembly of FIG. 1 according to the present disclosure.

The one-piece composite nose 48, best shown in FIGS. 7, 8, 9, 10, 11, and 12, is also formed as an integrated and unitary structure via an injection molding process from a rigid plastic material containing reinforcing fibers, such as fiberglass fibers. The one-piece composite nose 48 is generally formed as a concave planar structure that has an upper surface 82 and a lower surface 84, a raised forward edge 86, a lowered rearward edge 88, and a pair of raised opposed side edges 90. As shown in FIG. 12, the lowered rearward edge 88 is pivotally attached proximate the forward edge 58 of the one-piece composite pan 44. That is, opposed pivots 92 extend from the lower surface 84 of the one-piece composite nose 48 on a substantially vertically extending portions 94 formed on each of the raised opposed side edges 90. A pair of opposed pivot holes 96 is formed in a substantially vertically extending portion 98 formed on each opposed longitudinal side member 54 proximate the forward edge 58 of the one-piece composite pan 44. The substantially vertically extending portions 94, 98 on each of the of the one-piece composite nose 48 and the one-piece composite pan 44, respectively, when assembled, overlap one another proximate the lateral side of the motor vehicle seating assembly 10. During assembly, the opposed side edges 90 of the one-piece composite nose 48 are flexed inwardly, which allows the opposed pivots 92 to be inserted into the opposed pivot holes 96. When the opposed side edges 90 of the one-piece composite nose 48 are released, the opposed pivots 92 snap into and are restrained within the opposed pivot holes 96 allowing pivotable movement between the one-piece composite pan 44 and the one-piece composite nose 48 when assembled.

The one-piece composite nose 48 further includes a plurality of forward facing engagement members 100 disposed on the lower surface 84 thereof. The forward facing engagement members 100 comprise a plurality of integral molded-in modular assembly hooks 102. The plurality of integral molded-in modular assembly hooks 102 in turn preferably are formed as a row of resilient forward facing fingers evenly disposed across the transverse width of and depending from the lower surface 84 of the one-piece composite nose 48. Preferably, four integral molded-in modular assembly hooks 102 extend across the width of the one-piece composite nose 48. As a particularly advantageous feature of the present disclosure, each of the integral molded-in modular assembly hooks 102 is adapted to resiliently engage the front transverse cross tube 34 to readily allow modular attachment of the lower seat cushion and suspension module 20 to the lower seat frame base 18. The integral molded-in modular assembly hooks 102 also provide a pivotal connection with the front transverse cross tube 34 that allows the one-piece composite nose 48 to pivot about the front transverse cross tube 34 after the lower seat cushion and suspension module 20 is attached to the lower seat frame base 18.

Figure 9:
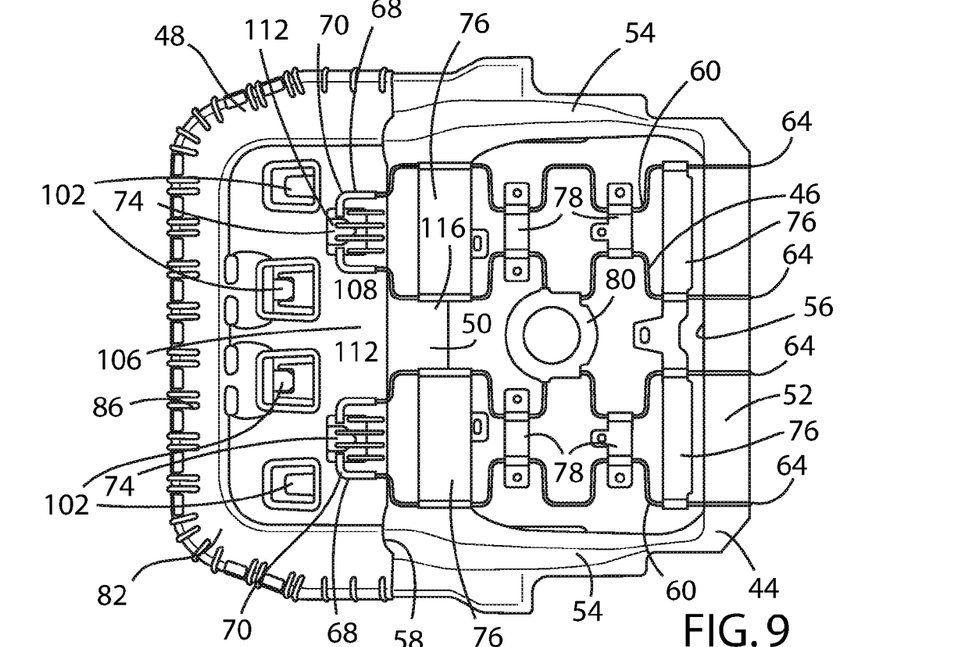
FIG. 9 is a top view of the one-piece composite pan, one-piece composite nose, and suspension system of the lower seat cushion and suspension module of the motor vehicle seating assembly of FIG. 1 according to the present disclosure.
Figures 10, 11:
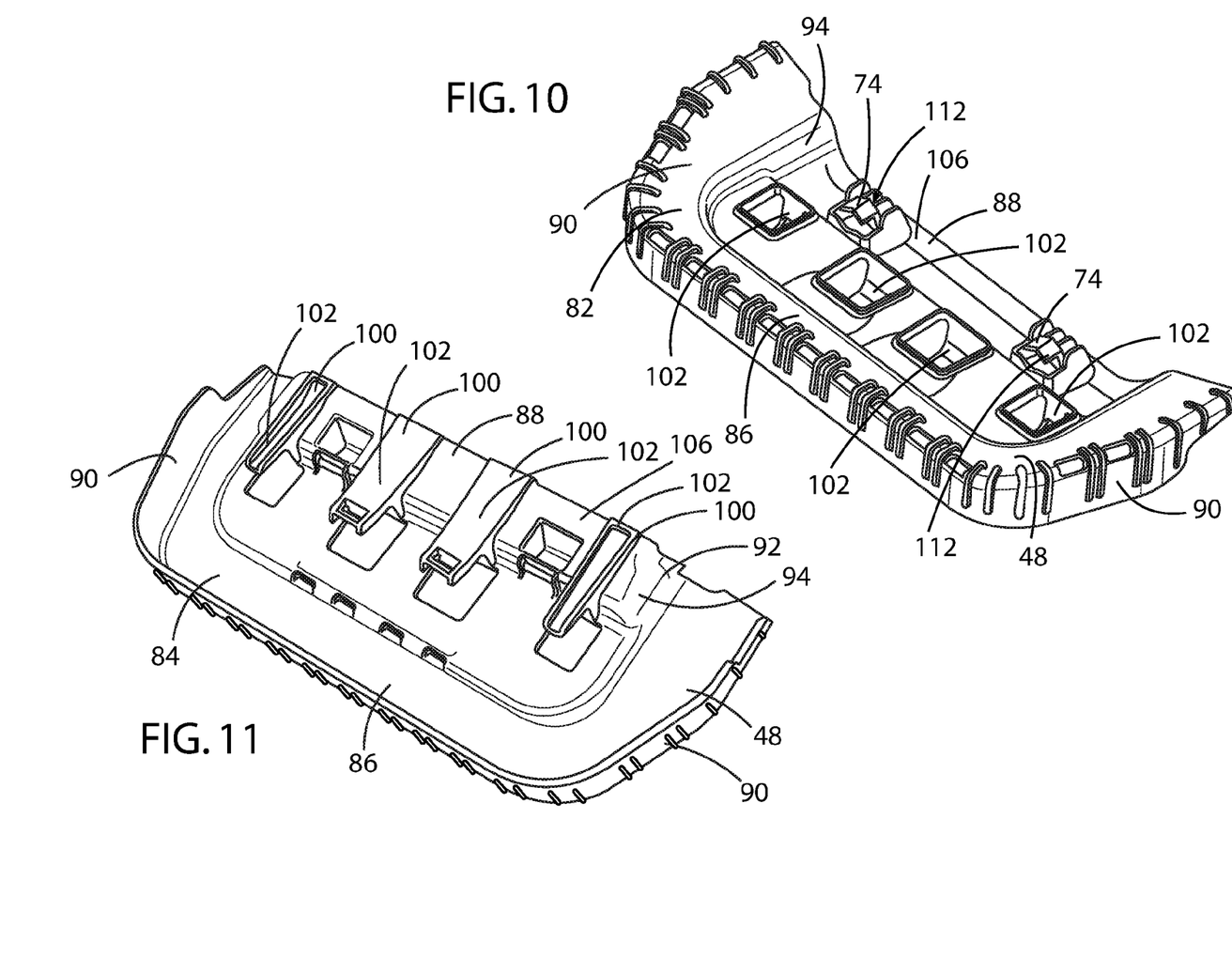
FIG. 10 is a perspective front top view of the one-piece composite nose of the lower seat cushion and suspension module of the motor vehicle seating assembly of FIG. 1 according to the present disclosure.
FIG. 11 is a perspective front bottom view of the one-piece composite nose of the lower seat cushion and suspension module of the motor vehicle seating assembly of FIG. 1 according to the present disclosure.

A rearward portion 106 of the one-piece composite nose 48 proximate the lowered rearward edge 88 of the one-piece composite nose 48, as shown in FIGS. 7, 9, and 12, forms the integrated cushion suspension modular attachment engagement member 74 that is pivotally and operatively connected with the suspension system 46. In particular, the integrated cushion suspension modular attachment engagement member 74 comprises a pair of forward facing integral molded-in suspension system hooks 112 extending above the upper surface 82 of the one-piece composite nose 48. Each of the forward facing integral molded-in suspension system hooks 112 are formed as forwardly facing fingers that resiliently engage a one each of the pair of forwardly extending buckles 70.

The forward facing integral molded-in suspension system hooks 112 extending above the upper surface 82 of the one-piece composite nose 48 uniquely allows pivotal attachment of the suspension system 46 of the lower seat cushion and suspension module 20 to the lower seating assembly 12 of the motor vehicle seating assembly 10. As further described below, this pivotable motion allows improved restraint against an occupant's forward momentum in the event of a frontal impact event, as well as improves the durability of the attachment of the suspension system 46 of the lower seat cushion and suspension module 20 throughout the overall duty cycle of the motor vehicle seating assembly 10.

The pivotable relationship between the lowered rearward edge 88 of the one-piece composite nose 48 and the forward edge 58 of the one-piece composite pan 44 is particularly advantageous in the dissipation of such forward momentum when used in combination with an inclined bearing surface 116 provided along the forward edge 58 of the front transverse member 50 of the one-piece composite pan 44. The inclined bearing surface 116 provides a surface against which the weight of an occupant in the motor vehicle seating assembly is urged in the event of a frontal impact event, such that the one-piece composite nose 48 rotates forwardly and upwardly about the integral molded-in modular assembly hooks 102, and the lowered rearward edge 88 of the one-piece composite nose 48 rotates upwardly about the opposed pivot 92 to raise the forward edge 58 of the one-piece composite pan 44. The resulting structure assists in restraining the occupant in the motor vehicle seating assembly. Preferably, the structure is designed to dissipate the energy imparted by 95th percentile dummy in a frontal impact event, while also supporting the hips of the occupant to prevent "submarining."

Preferably, the lower seat cushion and suspension module 20 further comprises a trim layer 118 and a foam layer 120 disposed in juxtaposed relation with each other. Further, preferably the trim layer 118 and the foam layer 120 each have a plurality of fasteners 122 disposed about a perimeter 124 thereof. As a further advantageous feature the present disclosure, the raised forward edge 86 and opposed side edges 90 of the one-piece composite nose 48 further comprise integral molded-in retention members 126 that receive a fastener 122 of the trim layer 118 and foam layer 120 to attach the trim layer 118 and the foam layer 120 to the lower seat cushion and suspension module 20 to enable the modular assembly of the lower seat cushion and suspension module 20 to the lower seating assembly 12.

As described above, the lower seat cushion and suspension module 20 of the present disclosure provides integrated modular assembly features and supports JIT assembly practices by modularizing the lower seating cushion and suspension module 20 into a single module and therefore reduce the costs of final assembly by allowing this assembly to be sourced to a location independent of the traditional JIT assembly plant. The above described lower seat cushion and suspension module 20 also provides improved frontal dynamic hip support and energy dissipation in the event of a frontal impact event. The one-piece composite pan 44 and one-piece composite nose 48 advantageously employ compounding technology to achieve high strength composite structures, while integrating several benefits and features into a low-cost and robust design and achieving a new look for styling.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle seating assembly for a motor vehicle having a lower seat assembly and an upwardly extending seat back assembly, the seat back assembly being pivotally coupled with the lower seat assembly, such that the seat back assembly can be moved between upright and inclined positions relative the lower seat assembly, the lower seat assembly comprising:
   a lower seat frame base having a pair of longitudinally extending mounting rails, a pair of side frame members operably connected with the mounting rails, and a transverse cross tube operatively connected with and extending between a forward portion of the pair of side frame members; and
   a lower seat cushion and suspension module attached to the lower seat frame base, the lower seat cushion and suspension module further comprising a one-piece composite pan having a forward edge, a suspension system mounted to and supported by the one-piece composite pan, and a one-piece composite nose having a rearward edge pivotally attached proximate the forward edge of the composite pan and a forward facing engagement member pivotally and operably connected with the transverse cross tube.

2. The motor vehicle seating assembly of claim 1, wherein the one-piece composite nose further includes a lower surface and the forward facing engagement member comprises a plurality of integral molded-in modular assembly hooks disposed on the lower surface.

3. The motor vehicle seating assembly of claim 2, wherein the plurality of integral molded-in modular assembly hooks comprises a row of resilient forward facing fingers evenly disposed across a transverse width of and depending from the lower surface of the one-piece composite nose, wherein each of the plurality of integral molded-in modular assembly hooks resiliently engages the transverse cross tube for modular attachment of the lower seat cushion and suspension module to the lower seat frame base.

4. The motor vehicle seating assembly of claim 1, wherein a rearward portion of the one-piece composite nose proximate the rearward edge of the one-piece composite nose comprises an integrated cushion suspension modular attachment engagement member pivotally and operatively connected with a forward portion of the suspension system.

5. The motor vehicle seating assembly of claim 4, wherein the integrated cushion suspension modular attachment engagement member comprises a pair of forward facing integral molded-in suspension system hooks extending above an upper surface of the one-piece composite nose and the forward portion of the suspension system includes a pair of forwardly extending buckles.

6. The motor vehicle seating assembly of claim 5, wherein each of the pair of forwardly extending buckles comprises a bent wire having a nominal thickness and the forward facing suspension system integral molded-in hooks extending above the upper surface of the one-piece composite nose comprise resilient forwardly facing fingers that resiliently engage a one of the pair of forwardly extending buckles.

7. The motor vehicle assembly of claim 1, wherein the one-piece composite pan has a pair of opposed side edges proximate the forward edge of the one-piece composite pan and the one-piece composite nose has a pair of opposed side edges proximate the rearward edge of the one-piece composite nose, wherein the opposed side edges of each of the one-piece composite pan and the one-piece composite nose overlap one another along each lateral side of the motor vehicle seating assembly and a pivot is disposed through each of the overlapped opposed side edges of the one-piece composite pan and the one-piece composite nose, whereby the one-piece composite pan is pivotally attached to the one-piece composite nose.

8. The motor vehicle seating assembly of claim 7, wherein the forward facing engagement member comprises a plurality of integral molded-in modular assembly hooks and the forward edge of the one-piece composite pan further comprises an inclined bearing surface against which the weight of an occupant in the motor vehicle seating assembly is urged in the event of a frontal impact event, such that the one-piece composite nose rotates forwardly and upwardly about the plurality of integral molded-in modular assembly hooks, and the rearward edge of the one-piece composite nose rotates upwardly around the pivots to raise the forward edge of the one-piece composite pan.

9. The motor vehicle seating assembly of claim 1, wherein the lower seat cushion and suspension module further comprises a trim layer, the trim layer having a plurality of fasteners about a perimeter thereof, and the forward edge of the one-piece composite nose further comprises integral molded-in retention members that receive a fastener of the trim layer to attach the trim layer to the lower seat cushion and suspension module to enable modular assembly of the lower seat cushion and suspension module.

10. The motor vehicle seating assembly of claim 9, wherein the lower seat cushion and suspension module further comprises a foam layer disposed below the trim layer, the foam layer having a plurality of fasteners about a perimeter thereof and received within the retention members to attach the foam layer to the lower seat cushion and suspension module to enable modular assembly of lower seat cushion and suspension module.

11. The motor vehicle seating assembly of claim 1, wherein the motor vehicle seating assembly further comprises a decorative plastic fascia mounted to the lower seat assembly and about the seat cushion and suspension module.

12. A lower seat assembly comprising a lower seat frame base having a transverse cross tube extending between a forward portion of a pair of side frame members, and a module attached to the lower seat frame base comprising a one-piece composite pan having a forward edge and a one-piece composite nose having a rearward edge pivotally attached proximate the composite pan forward edge and an engagement member pivotally connected with the transverse cross tube.

13. The lower seat assembly of claim 12, wherein the lower seat assembly further comprises a suspension system mounted to and supported by the one-piece composite pan and having a forward portion comprising a pair of forwardly extending buckles, the engagement member comprising a pair of forward facing integral molded-in suspension system hooks extending above an upper surface of the one-piece composite nose that engage a one of the forwardly extending buckles.

14. The lower seat assembly of claim 13, wherein each of the pair of forwardly extending buckles comprises a bent wire having a nominal thickness and the forward facing suspension system integral molded-in hooks extending above the upper surface of the one-piece composite nose comprise resilient forwardly facing fingers that resiliently engage a one of the forwardly extending buckles.

15. The lower seat assembly of claim 12, wherein the one-piece composite nose further includes a lower surface and the engagement member comprises a plurality of integral molded-in forward facing modular assembly hooks disposed on the lower surface and the plurality of integral molded-in modular assembly hooks comprises a row of resilient forward facing fingers evenly disposed across a transverse width of and depending from the lower surface of the one-piece composite nose, wherein each of the integral molded-in modular assembly hooks resiliently engages the transverse cross tube for modular attachment of the lower seat cushion and suspension module to the lower seat frame base.

16. The lower seat assembly of claim 15, wherein the lower seat cushion and suspension module further comprises a trim layer and a foam layer in juxtaposed relation with each other, the trim layer and the foam layer each having a plurality of fasteners disposed about a perimeter thereof, and the forward edge of the one-piece composite nose further comprises integral molded-in retention members that receive a fastener of the trim layer and foam layer to attach the trim layer and the foam layer to the lower seat cushion and suspension module to enable modular assembly of the lower seat cushion and suspension module.

17. A motor vehicle seating assembly comprising a lower seat assembly and an upwardly extending seat back assembly, the lower seat assembly comprising:
a lower seat frame base having a pair of longitudinally extending mounting rails, a pair of side frame members operably connected with the mounting rails, and a transverse cross tube operatively connected with and extending between a forward portion of the pair of side frame members; and
a lower seat cushion and suspension module attached to the lower seat frame base, the lower seat cushion and suspension module further comprising a one-piece composite pan having a forward edge, a suspension system mounted to and supported by the one-piece composite pan, and a one-piece composite nose having a rearward edge pivotally attached proximate the forward edge of the composite pan via a pair of pivots disposed on outer edges of each of the one-piece composite pan and one-piece composite nose, wherein the one-piece composite nose further includes a lower surface and a plurality of integral molded-in forward facing modular assembly hooks disposed on the lower surface wherein each of the plurality of integral molded-in modular assembly hooks pivotally and resiliently engages the transverse cross tube for modular attachment of the lower seat cushion and suspension module to the lower seat frame base, and wherein the forward edge of the one-piece composite pan further comprises an inclined bearing surface against which the weight of an occupant in the motor vehicle seating assembly is urged in the event of a frontal impact event, such that the one-piece composite nose rotates forwardly and upwardly about the plurality of integral molded-in modular assembly hooks, and the rearward edge of the one-piece composite nose rotates upwardly around the pivots to raise the forward edge of the one-piece composite pan.

18. The motor vehicle seating assembly of claim 17, wherein the lower seat assembly further comprises a suspension system mounted to and supported by the one-piece composite pan, the suspension system comprises a forward portion comprising a pair of forwardly extending buckles, the one-piece composite nose comprises an integrated cushion suspension modular attachment engagement member, and the integrated cushion suspension modular attachment engagement member comprising a pair of forward facing integral molded-in suspension system hooks extending above an upper surface of the one-piece composite nose that engage a one of the pair of forwardly extending buckles.

19. The motor vehicle seating assembly of claim 17, wherein the plurality of integral molded-in modular assembly hooks comprises a row of resilient forward facing fingers evenly disposed across a transverse width of and depending from the lower surface of the one-piece composite nose.

20. The motor vehicle seating assembly of claim 17, wherein the plurality of integral molded-in modular assembly hooks comprises a row of resilient forward facing fingers evenly disposed across a transverse width of and depending from the lower surface of the one-piece composite nose, wherein each of the integral molded-in modular assembly hooks resiliently engages the transverse cross tube for modular attachment of the lower seat cushion and suspension module to the lower seat frame base.

\* \* \* \* \*